United States Patent [19]

Allread et al.

[11] Patent Number: 5,685,575

[45] Date of Patent: Nov. 11, 1997

[54] POWER STEERING COUPLING ASSEMBLY

[75] Inventors: Alan R. Allread, Armada; Michael R. Martin, New Baltimore, both of Mich.; James W. Klopfenstein, II, Hamilton, Ind.

[73] Assignee: Aeroquip Corporation, MauMee, Ohio

[21] Appl. No.: 552,696

[22] Filed: Nov. 3, 1995

[51] Int. Cl.$^6$ .................................................. F16L 37/088
[52] U.S. Cl. ............................ 285/39; 285/321; 285/308
[58] Field of Search ................................. 285/321, 308, 285/39, 305

[56] References Cited

U.S. PATENT DOCUMENTS

| | | | |
|---|---|---|---|
| 3,432,191 | 3/1969 | Ludeman | 285/321 |
| 4,138,146 | 2/1979 | Rumble . | |
| 4,240,654 | 12/1980 | Gladieux . | |
| 4,438,779 | 3/1984 | Allread . | |
| 4,471,978 | 9/1984 | Kramer | 285/39 |
| 4,660,866 | 4/1987 | Jones et al. . | |
| 4,749,214 | 6/1988 | Hoskins et al. . | |
| 4,793,637 | 12/1988 | Laipply et al. | 285/39 |
| 4,850,622 | 7/1989 | Suzuki . | |
| 4,906,031 | 3/1990 | Vyse . | |
| 4,936,544 | 6/1990 | Bartholomew . | |
| 4,979,765 | 12/1990 | Bartholomew . | |
| 5,161,834 | 11/1992 | Norkey | 285/39 |
| 5,226,682 | 7/1993 | Marrison et al. . | |
| 5,482,083 | 1/1996 | Jenski . | |
| 5,488,972 | 2/1996 | McCracken et al. . | |
| 5,553,895 | 9/1996 | Karl et al. | 285/321 |

FOREIGN PATENT DOCUMENTS

| | | | |
|---|---|---|---|
| 654535 | 11/1964 | Belgium | 285/321 |
| 0168223 | 7/1985 | European Pat. Off. . | |
| 0308160 | 3/1989 | European Pat. Off. . | |
| 0373920 | 12/1989 | European Pat. Off. . | |
| 373920 | 6/1990 | European Pat. Off. | 285/321 |
| 0467381 | 1/1992 | European Pat. Off. . | |
| 0615089 | 3/1994 | European Pat. Off. . | |
| 766467 | 6/1934 | France | 285/91 |
| 2554543 | 5/1985 | France . | |
| 1024537 | 3/1966 | Germany . | |
| 1159155 | 7/1969 | Japan . | |
| 2195729 | 4/1988 | United Kingdom . | |

*Primary Examiner*—Eric K. Nicholson
*Attorney, Agent, or Firm*—Bliss McGlynn, P.C.

[57] ABSTRACT

A coupling assembly includes a first member and a second member. The first member has an exterior surface with a first projection extending radially outwardly. The second member has a cavity with an interior surface to receive the first projection on the first member and a second projection extending radially inwardly from the interior surface. The coupling assembly further includes a retaining ring disposed about the first member between the first projection and the second projection to retain the first member and second member together.

11 Claims, 3 Drawing Sheets

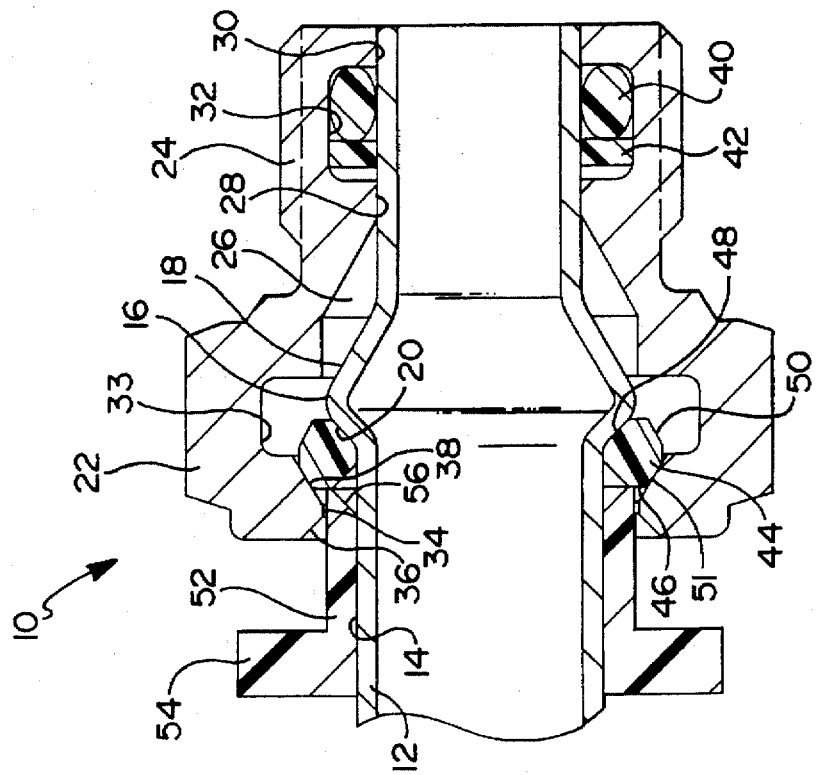
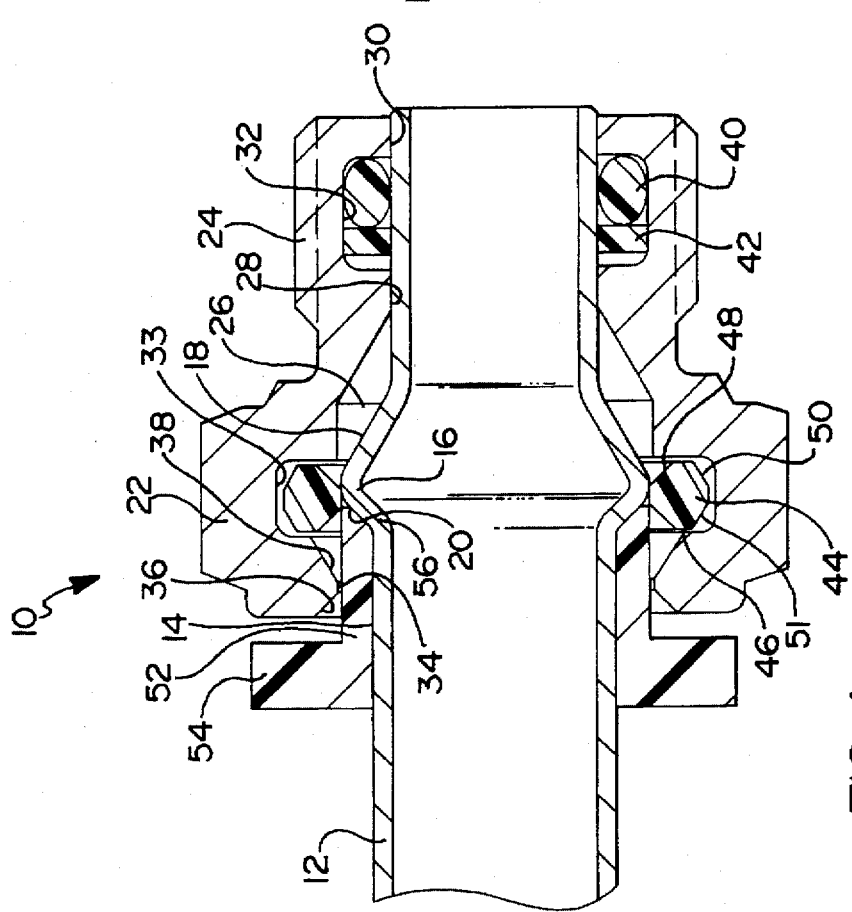

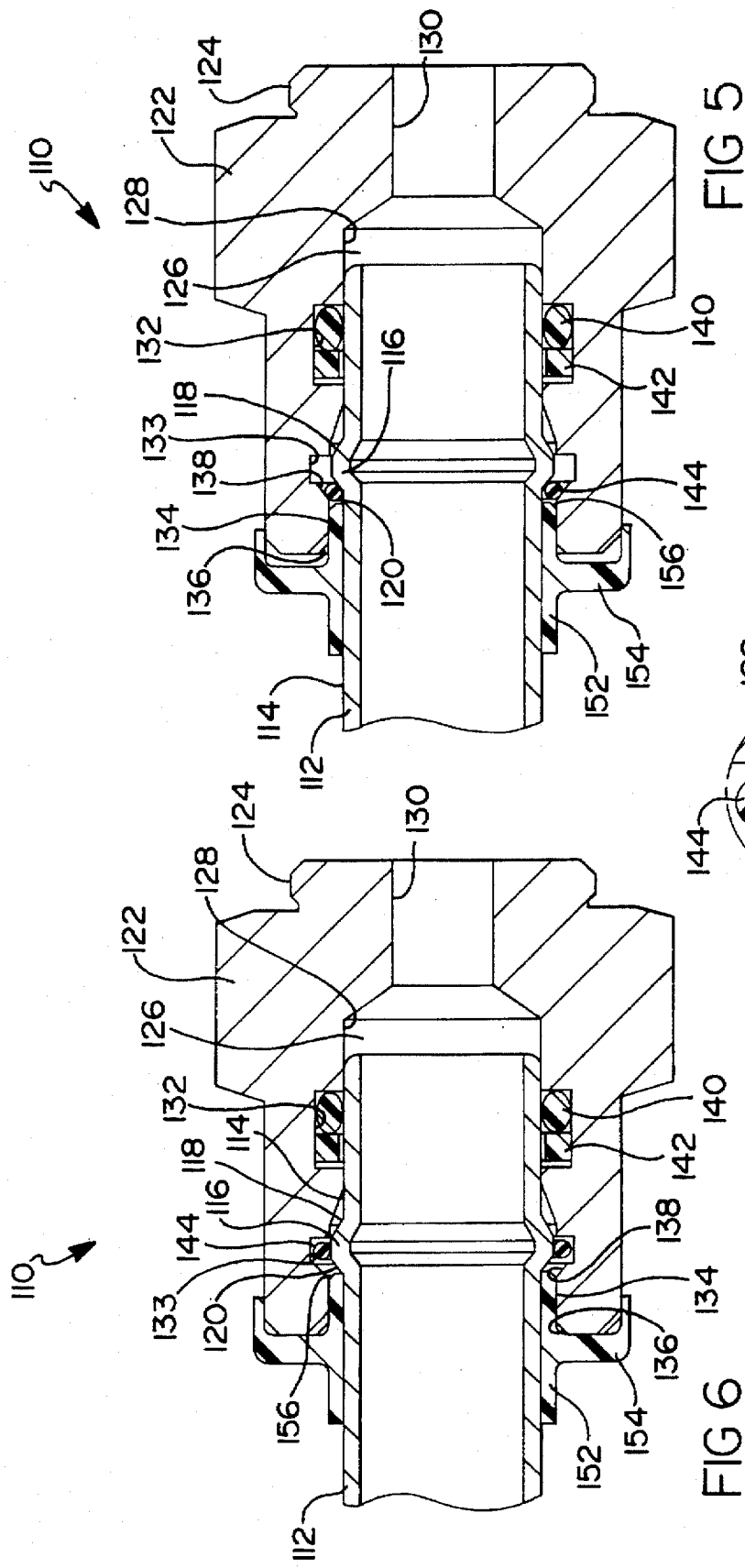

1

POWER STEERING COUPLING ASSEMBLY

BACKGROUND OF THE INVENTION

1. Field of the Invention

The present invention relates generally to coupling assemblies and, more particularly, to a coupling assembly for a power steering unit on a motor vehicle.

2. Description of the Related Art

It is known to provide a coupling assembly for connecting two members together. An example of such a coupling assembly is disclosed in U.S. Pat. No. 5,226,682 to Marrison et al. This patented coupling assembly includes a first member and a second member. The first member has an exterior surface with a groove for receiving an annular locking ring. The second member has an inner surface with a cavity for receiving the locking ring. The first and second members are secured together when the locking ring is engaged in the groove and the cavity.

It is also known to provide motor vehicles with a power steering unit for pumping fluid through lines to assist the steering of the motor vehicle by an operator. The above patented coupling assembly may be used on the power steering unit of some motor vehicles. There is a need in the art to provide a coupling assembly for quick connecting or releasing a line or conduit to a power steering unit on a motor vehicle in case the power steering unit needs to be removed.

SUMMARY OF THE INVENTION

It is, therefore, one object of the present invention to provide a coupling assembly for a power steering unit on a motor vehicle.

It is another object of the present invention to provide a coupling assembly having a low profile for a power steering unit on a motor vehicle.

It is yet another object of the present invention to provide a coupling assembly for quick connecting or releasing a conduit to a power steering unit on a motor vehicle.

To achieve the foregoing objects, the present invention is coupling assembly including a first member and a second member. The first member has an exterior surface with a first projection extending radially outwardly. The second member has a cavity with an interior surface to receive the first projection on the first member and a second projection extending radially inwardly from the interior surface. The coupling assembly further includes a retaining ring disposed about the first member between the first projection and the second projection to retain the first member and second member together.

One advantage of the present invention is that a coupling assembly is provided for a power steering unit on a motor vehicle. Another advantage of the present invention is that the coupling assembly may be provided with a low profile and compact design, allowing short bends in the line. Yet another advantage of the present invention is that the coupling assembly requires less assembly time for connecting or releasing a conduit to a power steering unit of a motor vehicle. Still another advantage of the present invention is that the coupling assembly allows for quick connecting or releasing a line or conduit to a power steering unit in case the power steering unit needs to be removed on some motor vehicles. A further advantage of the present invention is that the coupling assembly allows a swivel joint. A still further advantage of the present invention is that the coupling assembly is very economical to produce.

Other objects, features and advantages of the present invention will be readily appreciated as the same becomes better understood after reading the subsequent description taken in conjunction with the accompanying drawings.

BRIEF DESCRIPTION OF THE DRAWINGS

FIG. 3 is a fragmentary view of the coupling assembly of FIG. 1 illustrating a connect position.

FIG. 4 is a view similar to FIG. 3 illustrating a release position.

FIG. 5 is a fragmentary view of the coupling assembly of FIG. 2 illustrating a connect position FIG. 6 is a view similar to FIG. 5 illustrating a release position.

FIG. 7 is an enlarged view of a portion of the coupling assembly FIG. 6.

DESCRIPTION OF THE PREFERRED EMBODIMENT(S)

Figure 1:
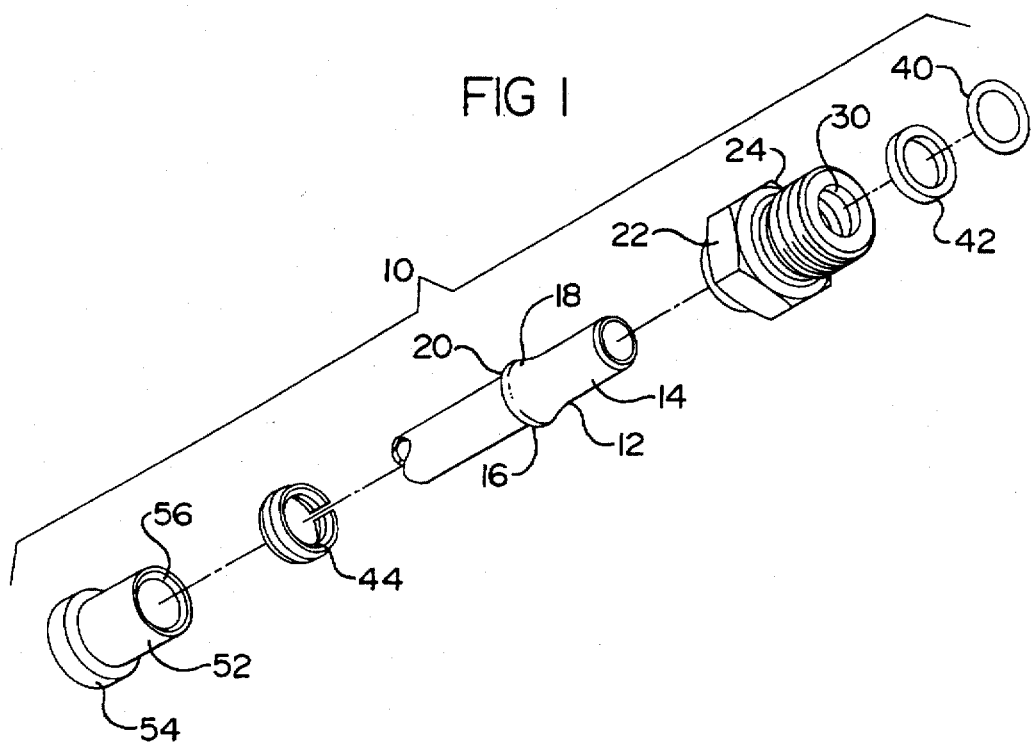
FIG. 1 is an exploded view of a coupling assembly, according to the present invention, for use on a power steering unit of a motor vehicle.

Referring to FIG. 1, one embodiment of a coupling assembly 10, according to the present invention, is shown. The coupling assembly 10 is preferably used for swivelably connecting a line or conduit to a power steering unit (not shown) of a motor vehicle (not shown). It should be appreciated that the coupling assembly 10 may be used for other suitable quick connect or release applications.

The coupling assembly 10 includes a conduit or first member 12 having a tubular configuration. The first member 12 has an exterior surface 14 with an annular projection 16 extending radially outwardly therefrom and spaced from one end thereof. The projection 16 has a sloping or inclined portion 18 extending from the apex of the projection 16 toward the end of the first member 12. The sloping portion 18 has a slope or incline of approximately thirty degrees (30°) relative to a longitudinal axis of the first member 12. The projection 16 also has a shoulder portion 20 opposite the sloping portion 18. The shoulder portion 20 has a slope or incline of approximately forty-five degrees (45°) relative to longitudinal axis of the first member 12. The projection 16 has a radial height of approximately 0.81 inches to present a "high" profile. The first member 12 is made of a metal material such as aluminum and has a predetermined diameter and wall thickness such as 0.375 inches and 0.035 inches, respectively. It should be appreciated that the first member 12 may be made of any suitable material, diameter and wall thickness.

The coupling assembly 10 also includes an adapter or second member 22 which is connected to the power steering unit and receives the first member 12. The second member 22 has a threaded portion 24 at one end which is threaded into a corresponding threaded port (not shown) of the power steering unit. Preferably the second member 22 is made of metal material such as steel. The second member 22 includes a cavity 26 at one end having an inner surface 28 and receiving the first member 12. The second member 22 also has an aperture 30 at the other end thereof which communicates with the cavity 26. The second member 22 has a groove 32 near one axial end which is annular and extends radially from the inner surface 28. The second member 22 has a groove 33 near the other axial end which is annular and extends radially from the inner surface 28. The second member 20 also has an annular projection 34 extending radially outwardly therefrom at the end opposite the aperture 30. The projection 34 has a first sloping or inclined portion 36 and a second sloping or inclined portion 38 opposite the first sloping portion 36. Preferably, the second sloping portion 38 has a slope of approximately sixty degrees (60°) from a radial plane for a function to be described.

The coupling assembly 10 also includes a seal 40 and a back-up ring 42 disposed in the groove 32 for engaging the first member 12. Preferably, the seal 40 is made of an elastomeric material and the back-up ring 42 is made of a plastic material. The seal 40 and back-up ring 42 are annular. The seal 40 has a generally circular cross-section and the back-up ring 42 has a generally rectangular cross-section. It should be appreciated that the seal 40 and back-up ring 42 resist leakage of fluid between the first member 12 and second member 22.

The coupling assembly 10 includes a retaining ring 44 cooperating between the first member 12 and second member 16 to retain or connect the first member 12 and second member 22 together. The retaining ring 44 is generally annular and made of a plastic material such as Nylon 46 or AMOOCL (AMOCO) ET-1000 commercially available from DSM Polymers of Southfield, Mich. The retaining ring 44 has a generally planar engagement portion 46 on one axial side for a function to be described. The retaining ring 44 has a first sloping or inclined portion 48 extending from an inner radial periphery to the other axial side opposite the engagement portion 46 to contact or engage the shoulder portion 20 of the projection 16 on the first member 12. The retaining ring 44 has a second sloping or inclined portion 50 extending from an outer radial periphery to the axial side opposite the engagement portion 46 to contact or engage the first sloping portion 36 of the projection 34 of the second member 22. The retaining ring 44 also has a third sloping or inclined portion 51 extending from an outer radial periphery to the engagement portion 46 to contact or engage the second sloping portion 38 of the projection 34 of the second member 22. The retaining ring 44 has a portion of its circumference removed to be discontinuous (e.g., 0.028 to 0.062 inches) and form two spaced apart ends to allow radial compression and expansion of the retaining ring 44. Preferably, the first sloping portion 48 has a slope of approximately forty-five degrees (45°) from an axial plane for a function to be described. Preferably, the second sloping portion 50 and third sloping portion 51 have a slope of approximately thirty degrees (30°) from an axial plane for a function to be described.

The coupling assembly 10 further includes a sleeve 52 for cooperating with the retaining ring 44. Preferably, the sleeve 52 is made of a plastic material. The sleeve 52 is generally tubular and cylindrical in shape. The sleeve 52 has a flange 54 extending radially outwardly at one end which may be grasped by an operator to move the sleeve 52 axially to the second member 22. The sleeve 52 also has a sloping or inclined portion 56 at the other end extending from an inner periphery to the axial end thereof. Preferably, the sloping portion 56 has a slope of approximately forty-five degrees (45°) from an axial plane for a function to be described. It should be appreciated that the angles for the above sloping portions are 30° and 45° from a longitudinal centerline but can vary.

Referring to FIG. 3, the coupling assembly 10 is shown assembled in a connect position. The seal 40 and back-up ring 42 are disposed in the groove 32. The first member 12 engages the seal 40 and back-up ring 42 and is stopped by engagement of the sloping portion 18 with the interior surface 28 of the cavity 26. The sleeve 52 is disposed in the cavity 26 of second member 22 and about the first member 12. The retaining ring 44 is disposed about the first member 12 such that the engagement surface 46 engages the axial end of the sleeve 52 and the first sloping portion 48 engages the shoulder portion 20 of the projection 16 of the first member 12 and the third sloping portion 51 engages the second sloping portion 38 of the projection 34 of the second member 22.

To release the first member 12 from the second member 22, the sleeve 52 is moved axially by an operator toward the second member 22. The axial end of the sleeve 52 engages the engagement portion 46 of the retaining ring 44. The retaining ring 44 is expanded by engagement of the sloping portion 51 with the sloping portion 38 and by engagement of the sloping portion 48 with the shoulder portion 20. The sleeve 52 moves the retaining ring 44 axially and radially into the groove 33 in a release position as illustrated in FIG. 4. The first member 12 is then moved axially by an operator away from the second member 22 to remove the first member 12 from the cavity 26 of the second member 22. It should be appreciated that once the first member 12 is removed, the retaining ring 44 returns to its original position such that the third sloping portion 51 engages the second sloping portion 38.

Figure 2:
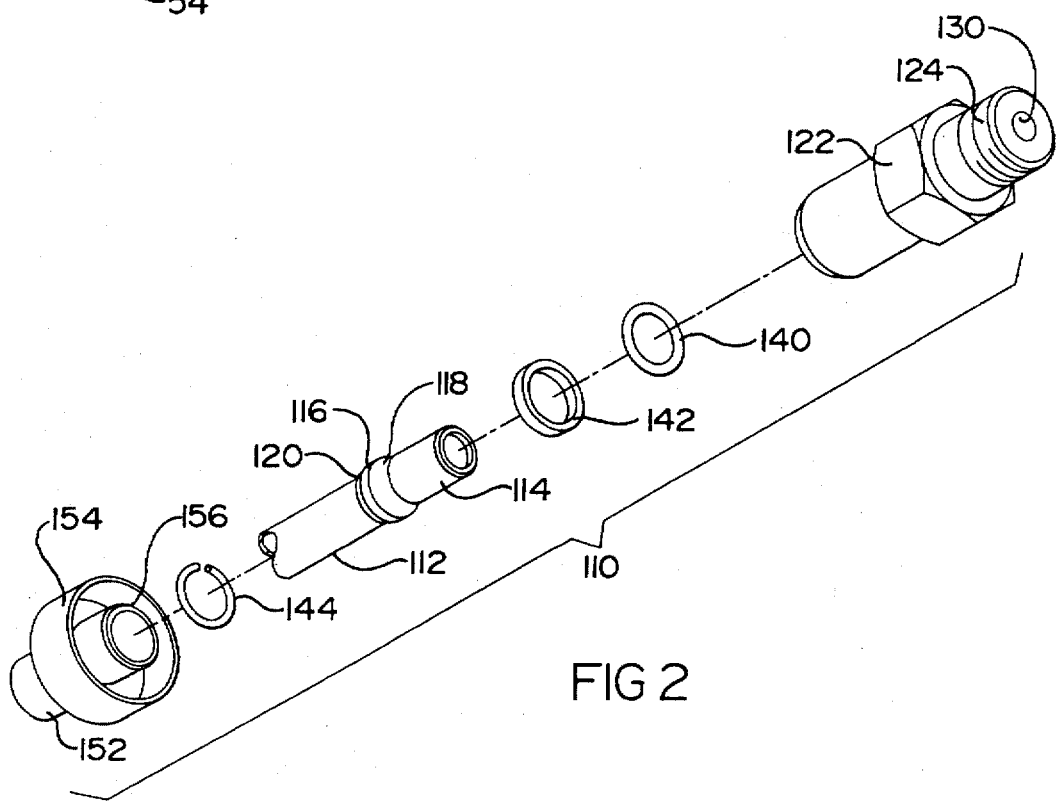
FIG. 2 is an exploded view of another coupling assembly, according to the present invention, for use on a power steering unit of a motor vehicle.

Referring to FIGS. 2, 5 and 7, another coupling assembly 110, accordingly to the present invention, is shown. Like parts of the coupling assembly 10 have like reference numerals increased by one hundred (100). For the coupling assembly 110, the projection 116 has a radial height of approximately 0.31 inches to have a "low" profile. The sloping portion 118 has a slope of approximately thirty degrees (30°) relative to a longitudinal axis of the first member 112. The shoulder portion 120 has a slope of approximately forty-five degrees (45°) relative to a longitudinal axis of the first member 112. The retaining ring 144 of the coupling assembly 110 has a generally circular cross-section. The sleeve 152 has the flange 154 extends radially outwardly between the axial ends thereof and the sloping portion 156 extending from an outer periphery to the axial end thereof.

Referring to FIG. 5, the coupling assembly 110 is shown assembled in a connect position. The seal 140 and back-up ring 142 are disposed in the groove 132. The first member 112 engages the seal 140 and back-up ring 142 and is stopped by engagement of the sloping portion 118 with the interior surface 128 of the cavity 126. The sleeve 152 is disposed in the cavity 126 of the second member 122 and about the first member 112. The retaining ring 144 is disposed about the first member 112 such that the axial end of the sleeve 152 contacts or engages the retaining ring 144 and the second sloping portion 138 contacts or engages the retaining ring 144.

To release the first member 112 from the second member 122, the sleeve 152 is moved axially by an operator toward the second member 122. The axial end of the sleeve 152 engages the retaining ring 144 which is expanded by engagement with the sloping portion 138 and shoulder portion 120. The sleeve 152 moves the retaining ring 144 axially and radially into the groove 133 in a release position as illustrated in FIGS. 6 and 7. The first member 112 is then moved axially by an operator away from the second member 122 to remove the first member 112 from the cavity 126 of the second member 122. It should be appreciated that, once the first member 112 is removed, the retaining ring 144 returns to its original position such that it engage the second sloping portion 138.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A coupling assembly comprising:

a first member;

a second member;

said first member having an exterior surface with a first projection extending radially outwardly;

said second member having a cavity with an interior surface to receive said first projection on said first member and a second projection extending radially inwardly from said interior surface;

a retaining ring disposed about said first member between said first projection and said second projection to retain said first member and said second member together;

said second member having a first groove extending radially from said interior surface and a second groove spaced axially from said first groove and extending radially from said interior surface;

a sleeve disposed about said first member and moveable axially therealong to engage said retaining ring to displace said retaining ring into said second groove to release said first member and said second member;

said first projection having a shoulder portion on one axial side;

said second projection having a first sloping portion on one axial side and a second sloping portion on another axial side; and said retaining ring having a third sloping portion extending from an inner periphery to one axial side and a fourth sloping portion extending from an outer periphery to the other axial side, said third sloping portion engaging said shoulder portion and said fourth sloping portion engaging said second sloping portion.

2. A coupling assembly as set forth in claim 1 including a seal ring disposed in said first groove to engage and disengage said first member.

3. A coupling assembly as set forth in claim 1 including a back-up ring disposed in said first groove to engage and disengage said first member.

4. A coupling assembly as set forth in claim 1 wherein said retaining ring has a generally circular cross sectional shape to engage and disengage said first sloping portion, said second sloping portion and said shoulder portion.

5. A coupling assembly as set forth in claim 1 wherein said retaining ring has a fifth sloping portion extending from the outer periphery to the one axial side to engage said first sloping portion.

6. A coupling assembly for a power steering unit on a motor vehicle comprising;

a first member;

a second member for connection to the power steering unit;

said first member having an exterior surface with a first projection extending radially outwardly;

said second member having a cavity with an interior surface to receive said first projection on said first member and a second projection extending radially inwardly from said interior surface;

a retaining ring disposed about said first member between said first projection and said second projection to connect said first member and said second member together;

a sleeve disposed about said first member and moveable axially therealong to engage said retaining ring to release said first member from said second member;

said second member having a first groove extending radially from said interior surface and a second groove spaced axially from said first groove and extending radially from said interior surface to receive said retaining ring;

said first projection having a shoulder portion on one axial side;

said second projection having a first sloping portion on one axial side and a second sloping portion on another axial side;

said retaining ring having a third sloping portion extending from an inner periphery to one axial side and a fourth sloping portion extending from an outer periphery to the other axial side, said third sloping portion engaging said shoulder portion and said fourth sloping portion engaging said second sloping portion.

7. A coupling assembly as set forth in claim 6 including a seal ring disposed in said first groove to engage and disengage said first member.

8. A coupling assembly as set forth in claim 6 including a back-up ring disposed in said first groove to engage and disengage said first member.

9. A coupling assembly as set forth in claim 6 wherein said retaining ring has a generally circular cross sectional shape.

10. A coupling assembly as set forth in claim 6 wherein said retaining ring has a fifth sloping portion extending from the outer periphery to the one axial side to engage said first sloping portion.

11. A coupling assembly for a power steering unit on a motor vehicle comprising:

a first member;

a second member for connection to the power steering unit;

said first member having an exterior surface with a first projection extending radially outwardly;

said second member having a cavity with an interior surface to receive said first projection on said first member and a second projection extending radially inwardly from said interior surface;

a retaining ring disposed about said first member between said first projection and said second projection to retain said first member and said second member together;

said second member having a first groove extending radially from said interior surface and a second groove spaced axially from said first groove and extending radially from said interior surface;

a seal ring disposed in said first groove to engage and disengage said first member;

a back-up ring disposed in said first groove to engage and disengage said first member;

a sleeve disposed about said first member and moveable axially therealong to engage said retaining ring and move said retaining ring into said second groove to release said first member from said second member;

said first projection having a shoulder portion on one axial side;

said second projection having a first sloping portion on one axial side and a second sloping portion on another axial side;

said retaining ring having a third sloping portion extending from an inner periphery to one axial side and a fourth sloping portion extending from an outer periphery to the other axial side, said third sloping portion engaging said shoulder portion and said fourth sloping portion engaging said second sloping portion.

* * * * *